Patented July 12, 1949

2,476,107

UNITED STATES PATENT OFFICE 2,476,107

METHOD FOR PRODUCTION OF PENICILLIN

Andrew J. Moyer, Peoria, Ill., assignor to the United States of America, as represented by the Secretary of Agriculture No Drawing. Application May 11, 1945, Serial No. 593,184

5 Claims. (Cl. 195—36)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This is a continuation in part of my copending application for patent Serial No. 530,234, filed April 8, 1944, and abandoned May 27, 1945.

This invention relates to a new and useful method for the production of penicillin.

Penicillin is a bactericidal or bacteriostatic compound that may be produced by organisms, such as *Penicillium notatum* Westling, as reported by Fleming (Brit. Jour. Exper. Path. 10, 226 (1929)), who first observed the inhibition of bacterial growth in the vicinity of *P. notatum* colonies on Petri-dish cultures. Penicillin possesses extremely valuable antibacterial properties which favor its application in the treatment of numerous infections. It is especially effective in repressing or killing Gram-positive staphylococci, pneumococci, gonococci, and numerous streptococci. The physical and chemical properties of penicillin have been described by Abraham and Chain (Brit. Jour. Exper. Path. 23, 103, June 1942).

A major problem in making practical use of the valuable properties of penicillin has been the production of this substance by the fungus cultures in quantities large enough to provide sufficient penicillin for therapeutic use. Thus, although as much as one or two million "Oxford units" (Abraham et al., Lancet 2, 177, August 16, 1941) of penicillin might be required to treat each human infection, only two to eight "Oxford units" of penicillin could be produced per milliliter of fermentation medium by methods heretofore used, and numerous attempts to increase the efficiency of penicillin formation have been unsuccessful. The "Oxford unit" is at the present time the only means of evaluating penicillin, since its chemical structure is not known.

I have found a method of increasing the penicillin content of culture liquors of a penicillin-producing mold, such as *Penicillium notatum* Westling, *Penicillium chrysogenum* Thom, *Penicillium baculatum* Westling, and *Penicillium cyaneo-fulvum* Biourge, many-fold beyond that taught by the prior art, and to such an extent that production of penicillin for use as a therapeutic agent is now more feasible on a commercial basis. In addition to giving a better yield of penicillin, the present invention offers numerous other advantages, which will be apparent from the following description.

Whereas previously used methods resulted in a slow production of penicillin during the first few days of the fermentation period, and a very rapid destruction of penicillin during the 24- to 48-hour period immediately following the time when the fermentation medium attained its maximum penicillin content, this invention results in the more rapid production of much greater qutntities of penicillin in the culture liquors and the maintenance of a high level of penicillin content for several days after the maximum penicillin content is reached. The advantage of having a high penicillin content persisting for several days in a culture medium will be apparent when it is realized that the microbiological assay method used for the measurement of the penicillin content of liquors is slow (usually a 15- to 18-hour procedure), and that in previously used culture methods, much of the penicillin often disappeared from the fermentation liquors before the assay result indicating the peak production was obtained. When cultures are made according to the present invention, little or no penicillin disappears from the fermentation liquor by the time the assay results indicating peak production are obtained; accordingly, large batches of fermentation liquor of proven potency can be processed with the assurance that their penicillin content is high.

Previous investigators (Abraham et al., Lancet 2, 177 (1941)) have employed for penicillin production Czapek-Dox medium of the following composition:

| | Grams |
|---|---|
| Glucose | 40 |
| NaNO₃ | 3 |
| KH₂PO₄ | 1 |
| KCl | 0.5 |
| MgSO₄.7H₂O | 0.5 |
| FeSO₄.7H₂O | 0.01 |

Water to make one liter.

When a penicillin-producing mold is cultivated on this medium, growth is slow, and the acidity of the medium increases for three to five days, after which there is a slow rise in pH accompanied by a weak production of penicillin, usually amounting to two to eight "Oxford units" per ml. in eight to nine days.

I have found that greatly increased quantities of penicillin are formed, and that the penicillin content of the fermentation liquor is maintained at a high level for an increased period of time, if a medium of the following type is used:

| | | |
|---|---|---|
| Assimilable carbon source | grams | 5 to 100 |
| Proteinaceous material | do | 5 to 100 |
| $MgSO_4.7H_2O$ | do | 0.1 to 0.5 |
| $KH_2PO_4$ | do | 0.3 to 3.0 |
| $NaNO_3$, $KNO_3$, $Ca(NO_3)_2$, $Mg(NO_3)_2$, $Sr(NO_3)_2$, or $CsNO_3$ | grams | 1 to 5 |
| $ZnSO_4.6H_2O$ | milligrams | 8 to 80 |
| Ferric tartrate | do | 10 to 100 |
| Water to make one liter. | | |

Using such a medium, penicillin production amounts to as much as 200 Oxford units per milliliter in incubation periods of 7 to 9 days. Assimilable carbon source includes ions of an assimilable organic acid, polyhydric alcohol and saccharides (carbohydrate). Proteinaceous material includes unmodified protein and protein degradation products, particularly such products as arise from the hydrolysis of the protein. These protein degradation products include proteoses, peptones, polypeptides, peptides, and amino acids.

The success of this method lies in part in the fact that the rapidly assimilated glucose of the Czapek-Dox medium is replaced with a less readily assimilated carbohydrate derivative which serves as a sustained source of energy or nutrition for the fungus throughout substantially the entire fermentation period, and thereby retards the development of conditions adverse to penicillin formation and stability.

Carbohydrates of the class known as polysaccharides, which comprises those carbohydrates containing more than one monosaccharide unit per molecule, are admirably suited to this purpose, since they are acted upon slowly by the fungus or fungus enzymes to yield assimilable sugar, yet are sufficiently resistant to such fungus or enzyme action as to persist in the nutrient medium in considerable quantity throughout the course of the incubation period so as to provide a reservoir for the nutrition of the fungus. The maintenance of such a condition of nutrition is very favorable to the obtaining of high yields of penicillin. The poor penicillin production obtained when glucose is supplied as the carbon source, in the manner of the prior art, is believed to be due to the rapid and complete metabolism of this sugar by the fungus, resulting in a carbohydrate exhaustion of the medium and the creation of an unfavorable environment for penicillin production.

Lactose, starch, raffinose, melibiose, sucrose, inulin, dextrins, molasses, maltose or cereal grain mashes are excellent polysaccharides for the purpose of this invention. Lactose may be supplied either as the purified sugar or as whey or whey concentrate. Starch may be supplied as unmodified starch, or as high fluidity (acid modified) starch, or it may be subjected to the action of acid or of liquefying or dextrinizing enzymes in the course of the preparation of the medium. It is desirable, but not essential, that the starch be present in such concentration and in such a state of modification or liquefaction that the nutrient medium is fluid at the time of inoculation. Modified starch, such as the commercial "90-fluidity" starch, is suitably used, as is also enzyme liquefied starch. Potato starch, corn starch, wheat starch, tapioca starch and rice starch have been found suitable. Sucrose may be used in the form of purified sugar or as cane or beet molasses. Grain mashes, such as corn, wheat, or barley mash, either malted or unmalted, may also be used. Such mashes are particularly suitable because they provide at a low cost not only starch and dextrins, but also an appreciable quantity of minerals, growth factors, and proteinaceous material which are favorable to penicillin production and stabilization in the fermentation medium. Some of the grain mashes, as well as some whey concentrates, are sufficiently rich in protein that extra proteinaceous adjuncts need not be added to the medium. Various mixtures and combinations of the above carbon sources may be used.

Monosaccharides such as glucose, fructose, and arabinose are suitable carbon sources for the purpose of this invention, even though they are more rapidly assimilated than the polysaccharides.

Glucose is a normal component of corn-steeping liquor and, as such, serves as a source of carbon for the penicillin-producing mold.

Ions of assimilable organic acids, such as ions of gluconic, lactic, and citric acids are suitable carbon sources for the purpose of this invention. These organic acids appear to be of the same value as carbon sources as the monosaccharides. Ions of such an organic acid may be used in combination with another assimilable carbon source. Lactic acid is a normal component of corn-steeping liquor and, as such, serves as a carbon source.

Sugar alcohols, which are reduction products of various sugars, are also excellent carbon sources for the purpose of this invention, since they are slowly utilized by the fungus, with substantially the same effect as when polysaccharides are provided. Thus, glycerol, sorbitol, mannitol, dulcitol and erythritol have been found effective, either singly or in combination.

The success of this invention is also due, in part, to the fact that there is incorporated in the nutrient medium a considerable quantity of proteinaceous material either in the form of unhydrolyzed protein or in the form of protein materials which have undergone various degrees of hydrolysis. Although the incorporation of these materials in the nutrient medium favors the rapid production of large quantities of penicillin, and maintains the penicillin concentration at a high level during the final stages of the fermentation period, the precise mode of action of these nitrogenous materials is not known with certainty. It is probable that by virtue of the buffering capacity of their constituent amino acids or of the alkaline or acidic properties of their decarboxylated or deaminated constituent amino acids, these proteinaceous materials act as a means of regulating the pH of the culture medium at favorable levels during the course of the fermentation period, or that they supply some organic compound which is essential to the chemical structure of the penicillin molecule.

It is also considered possible that the added proteinaceous materials may serve as agents upon which may be expended the action of enzymes which otherwise would inactivate the penicillin. The existence of such inactivating enzymes is known.

A wide variety of proteinaceous materials is effective in favoring penicillin production and stabilization; thus, corn-steeping liquor, wheat-steeping liquor, acid-hydrolyzed casein, enzyme-hydrolyzed casein, whey or whey concentrate, soybean meal, distillers grain slops, acid-hydrolyzed corn gluten, acid-hydroyzed wheat gluten, and synthetic mixtures of numerous amino acids have been successfully employed. These proteinaceous materials need not be supplied in a high degree of purity; the less pure materials which carry traces of growth factors and considerable quantities of mineral nutrients are suitable for use. The use of corn-steeping liquor is especially advantageous, since it is a cheap, readily available byproduct of the corn wet-milling industries of this country. Corn-steeping liquor, supplied to the trade as the concentrated (30° Bé.) product, has the approximate analysis: Moisture 40–45 percent; proteins and protein hydrolysis products 25–27 percent; carbohydrate 21–23 percent; and ash 9–10 percent. Since the ash of corn-steeping liquor consists principally of potassium, magnesium, phosphate, and sulfate, the use of this liquor as a constituent of the nutrient medium makes unnecessary the addition of potassium phosphate and magnesium sulfate, and thus simplifies and cheapens the process.

The presence of the nitrate ion in the nutrient medium is essential for good penicillin production. Sodium nitrate, as previously used, is a suitable source of nitrate ion. I have found that, in addition, other nitrates of the alkaline and alkaline earth metals, such as potassium, caesium, calcium, magnesium, and strontium, may be used for this purpose.

Media containing the above-mentioned assimilable carbon sources, the above-mentioned proteinaceous materials, and the above-mentioned nitrates are suitable for the production of penicillin by cultivation of *P. notatum* in either surface culture or submerged culture, the surface culture method being the procedure which has been previously employed, and the submerged culture procedure being that in which the fungus is kept submerged by simultaneous aeration and agitation of the medium, as described in my copending application for patent Serial No. 530,-233, filed April 8, 1944, and abandoned May 27, 1945 (continuation in part Serial No. 593,185, filed May 11, 1945, and granted as Patent No. 2,443,989). When the above medium constituents are used for the production of penicillin in submerged culture, they are required in only about half the quantity necessary for the surface culture process, owing to increased efficiency of the fungus metabolism and better diffusion of products to and from the fungus cells. In submerged culture medium, it is especially important that a rather high degree of fluidity be maintained, so as to permit distribution of the fungus cells throughout the medium, and thorough aeration of the mass. Such fluidity automatically prevails if lactose, raffinose, maltose, melibiose, sucrose, molasses, or sugar alcohols are employed as nutrient constituents, and is readily obtained with starchy or dextrinous mashes by the various modification procedures described above.

As illustrative of the manner in which this invention may be practiced, the following examples are cited, although the details are to be considered in no way restrictive:

Example I

A nutrient medium was prepared by dissolving 44 g. of lactose (U. S. P.), 3.0 g. of sodium nitrate, and 0.015 g. of zinc sulfate in approximately 500 ml. of water, adding thereto 75 ml. of concentrated corn-steeping liquor (30° Bé.), and sufficient water to make a total volume of one liter. After thorough mixing, 50 ml. aliquots were placed in 200 ml. Erlenmeyer flasks, which were plugged with cotton and sterilized at 15 lb. steam pressure in the conventional manner. After cooling to room temperature, each flask was inoculated with spores of *P. notatum* Westling. The flasks were incubated at 24° C.

Samples of the fermentation medium, withdrawn at intervals for determination of penicillin content by the cup-plate agar method of Abraham et al. (Lancet 2, 177 (1941)) showed the following results:

| Incubation Period (days) | Penicillin Content (Oxford units per ml. of fermentation medium) |
|---|---|
| 4 | 72 |
| 5 | 103 |
| 6 | 136 |
| 7 | 152 |
| 8 | 154 |

Example II 40 g. of commercial corn starch was suspended in approximately 500 ml. of water containing sufficient sulfuric acid to make the acid concentration 0.005 N. After gelatinizing at 70° to 80° C., this starch suspension was heated at 120° C. for 30 minutes, so as to liquefy but not appreciably saccharify the starch. After cooking the starch suspension, 60 ml. of concentrated corn-steeping liquor (30° Bé.) and 3.0 g. of sodium nitrate were added, together with sufficient water to make a total volume of one liter. 50 ml. aliquots of the medium were placed in 200 ml. Erlenmeyer flasks, and the flasks were plugged with cotton. After sterilizing at 120° C., and cooling to room temperature, each flask was inoculated with spores of *P. notatum* Westling. The flask cultures were incubated at 24° C. At intervals, samples of the fermentation medium were withdrawn for assay for penicillin content, with the following results:

| Incubation Period (days) | Penicillin Content (O. u./ml.) |
|---|---|
| 4 | 52 |
| 5 | 91 |
| 6 | 129 |
| 7 | 136 |
| 8 | 134 |

Example III 100 g. of ground corn and 0.5 g. of ground distillers barley malt were suspended in approximately 600 ml. of water and held, with continuous stirring, at 40° C. for 15 minutes. The temperature was then increased rapidly to 70° C., where it was maintained for 15 minutes to effect liquefaction and dextrinization. The mash was then heated to 90° C. to inactivate the enzyme naturally present in the grain. After adding 3.0 grams of sodium nitrate and 70 grams of concentrated corn-steeping liquor, the total volume was adjusted to one liter. To 200 ml. Erlenmeyer flasks, 50 ml. aliquots of this medium were added, the flasks were plugged with cotton, and sterilized by steaming in the conventional manner. After cooling, each flask was inoculated with spores of *P. notatum* Westling, and incubated at 24° C. Samples withdrawn for assay at intervals showed the following results:

| Incubation Period (days) | Penicillin Content (O.u./ml.) |
|---|---|
| 4 | 26 |
| 5 | 62 |
| 6 | 117 |
| 7 | 146 |
| 8 | 129 |

Example IV

A medium prepared as in Example I was diluted with an equal volume of water and dispensed in 50 ml. aliquots into 200 ml. Erlenmeyer flasks, which were plugged with cotton and steam sterilized in the conventional manner. After cooling to room temperature, each flask was inoculated with a germinated spore suspension of *P. notatum* Westling. The flasks were then placed on a Ross-Kershaw shaking machine which imparted a whirling motion to the liquid medium. (The shaking table revolved at about 200 revolutions per minute.) The fungus grew in the submerged state, and produced penicillin readily, as shown by the following assay values obtained at various intervals.

| Incubation Period (days) | Penicillin Content (O.u./ml.) |
|---|---|
| 3 | 21 |
| 4 | 39 |
| 5 | 58 |
| 6 | 90 |
| 7 | 86 |
| 8 | 72 |

Example V

A medium containing 80 ml. of concentrated corn-steeping liquor, 3.0 g. of $NaNO_3$, 0.015 g. of zinc sulfate, and 30 g. of glycerol was made up to a total volume of 1 liter. After thorough mixing, 50 ml. aliquots were placed in 200 ml. Erlenmeyer flasks which were plugged with cotton and sterilized at 15 lb. steam pressure in the conventional manner. After cooling to room temperature, each flask was inoculated with spores of *P. notatum* Westling. The flasks were incubated at 24° C. Samples withdrawn for assay at daily intervals showed the following results:

| Incubation Period (days) | Penicillin Content (O. u./ml.) |
|---|---|
| 3 | 14 |
| 4 | 43 |
| 5 | 80 |
| 6 | 74 |

Example VI

A medium was prepared by dissolving 22.0 g. of glucose, 0.25 g. of $MgSO_4.7H_2O$, 0.50 g. of $KH_2PO_4$, 3.0 g. of $NaNO_3$, 0.015 g. of zinc sulfate, and 30 ml. of concentrated corn-steeping liquor in sufficient water to make 1 liter. After thorough mixing, 50 ml. aliquots were placed in 200 ml. Erlenmeyer flasks, which were plugged with cotton and sterilized at 15 lb. steam pressure in the conventional manner. After cooling to room temperature, the flasks were inoculated with spores. Cultures were prepared for five different Penicillia. The flasks were incubated at 24° C. Samples were withdrawn on the sixth day for determination of penicillin content by the cup-plate agar method of Abraham et al. (1941), with the following results:

| Organism | Penicillin content (Oxford units per ml. of fermented medium) |
|---|---|
| *Penicillium notatum* Westling NRRL 832 | 25 |
| *Penicillium notatum* Westling NRRL 1249 | 24 |
| *Penicillium baculatum* Westling NRRL 843 | 38 |
| *Penicillium chrysogenum* Thom NRRL 815 | 20 |
| *Penicillium cyaneo-fulvum* Biourge NRRL 838 | 41 |

Example VII

A medium containing 40 ml. of concentrated corn-steeping liquor; 3.0 g. of $NaNO_3$; 40.0 g. of sorbitol, 0.25 g. of $MgSO_4.7H_2O$; 0.50 g. of $KH_2PO_4$ was made up to a total volume of 1 liter. After thorough mixing, 50 ml. aliquots were placed in 200 ml. Erlenmeyer flasks, which were plugged with cotton and steam sterilized at 15 lb. steam pressure in the conventional manner. After cooling to room temperature, each flask was inoculated with spores of *P. notatum* Westling. Samples withdrawn for assay at daily intervals showed the following results:

| Incubation Period (days) | Penicillin content (O. u./ml.) |
|---|---|
| 3 | 18 |
| 4 | 29 |
| 5 | 38 |
| 6 | 37 |
| 7 | 29 |

Example VIII

A nutrient medium was prepared containing the same nutrient salts as in Example I, but contained 50 ml. of a concentrated grain malt syrup, which consisted of about 50 percent sugar. Other sugars and corn-steeping liquor were not included. The cultures were prepared and inoculated with *P. notatum* Westling, as explained in Example I. The following penicillin yields were obtained:

| Incubation Period (days) | Penicillin content (Oxford units) |
|---|---|
| 3 | 14 |
| 4 | 19 |
| 5 | 32 |
| 6 | 30 |

Example IX

A nutrient medium was prepared containing the same nutrient salts as in Example I, and a trypsin hydrolyzed casein (1 percent dry casein) and 33.0 g. of glucose per liter of medium. No corn-steeping liquor was employed. The cultures were prepared and inoculated with *P. notatum* Westling as explained in Example I. The following penicillin yields were obtained:

| Incubation Period (days) | Penicillin content (Oxford units per ml. of fermented medium) | |
|---|---|---|
| | Control | +Casein |
| 4 | 1 | 12 |
| 5 | 3 | 19 |
| 6 | 4 | 22 |
| 7 | 4 | 20 |

Example X

A medium containing 12.0 g. of partially hydrolyzed soybean meal, 35.0 g. of lactose, 5.5 g. of sucrose, 0.25 g. of $MgSO_4.7H_2O$, 0.50 g. of $KH_2PO_4$, 0.044 g. of zinc sulfate was made up to total volume of one liter. After thorough mixing, 50 ml. aliquots were placed in 200 ml. Erlenmeyer flasks, which were plugged with cotton and steam sterilized at 15 lb. steam pressure in the conventional manner. After cooling to room temperature, each flask was inoculated with spores of *P. notatum* Westling. All cultures were incubated at 24° C. Samples were withdrawn at intervals, showing the following penicillin content:

| Incubation Period (days) | Penicillin content (Oxford units per ml. of fermented medium) |
|---|---|
| 5 | 7 |
| 7 | 22 |
| 9 | 27 |

Having thus described my invention, I claim:

1. A method for the production of penicillin comprising cultivating a penicillin-producing mold in an aqueous nutrient medium containing from 5 to 100 g. of a source of assimilable carbon and from 5 to 100 g. of a degraded proteinaceous material per liter of medium.

2. A method for the production of penicillin comprising cultivating a penicillin-producing mold in an aqueous nutrient medium containing from 5 to 100 g. of a carbohydrate and from 5 to 100 g. of a degraded proteinaceous material per liter of medium.

3. A method for the production of penicillin comprising cultivating a penicillin-producing mold in an aqueous nutrient medium containing from 5 to 100 g. of lactose and from 5 to 100 g. of a degraded proteinaceous material per liter of medium.

4. A method for the production of penicillin comprising cultivating a penicillin-producing mold in an aqueous nutrient medium containing from 5 to 100 g. of a source of assimilable carbon and from 5 to 100 g. of corn-steeping liquor per liter of medium.

5. A method for the production of penicillin comprising cultivating a penicillin-producing mold in an aqueous nutrient medium containing from 5 to 100 g. of lactose and from 5 to 100 g. of corn-steeping liquor per liter of medium.

ANDREW J. MOYER.

REFERENCES CITED

The following references are of record in the file of this patent:

UNITED STATES PATENTS

| Number | Name | Date |
|---|---|---|
| 1,434,462 | Wagner | Nov. 7, 1922 |
| 1,582,408 | Legg | Apr. 27, 1926 |

OTHER REFERENCES

Abraham et al., The Lancet, Aug. 16, 1941, page 177.

Fleming, British Jr. of Exper. Pathology (10) 1929, pages 226 and 231.